(12) United States Patent
In et al.

(10) Patent No.: US 8,421,901 B2
(45) Date of Patent: Apr. 16, 2013

(54) DISPLAY APPARATUS AND IMAGING APPARATUS

(75) Inventors: Tetsuo In, Yokohama (JP); Shoei Nakamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 153 days.

(21) Appl. No.: 12/689,529

(22) Filed: Jan. 19, 2010

(65) Prior Publication Data

US 2010/0194906 A1 Aug. 5, 2010

(30) Foreign Application Priority Data

Jan. 23, 2009 (JP) ................................. 2009-013134

(51) Int. Cl.
*H04N 5/222* (2006.01)

(52) U.S. Cl.
USPC .............. 348/333.12; 348/222.1; 348/231.99; 382/103; 382/115; 382/118

(58) Field of Classification Search ............... 348/222.1, 348/333.12, 231.99; 382/103, 115, 118
See application file for complete search history.

(56) References Cited

U.S. PATENT DOCUMENTS

| | | | | |
|---|---|---|---|---|
| 5,771,307 A | * | 6/1998 | Lu et al. | 382/116 |
| 6,345,111 B1 | * | 2/2002 | Yamaguchi et al. | 382/118 |
| 7,460,150 B1 | * | 12/2008 | Coughlan et al. | 348/169 |
| 2004/0095359 A1 | * | 5/2004 | Simon et al. | 345/619 |
| 2004/0208114 A1 | | 10/2004 | Lao et al. | |
| 2005/0117186 A1 | * | 6/2005 | Li et al. | 359/15 |
| 2005/0128332 A1 | * | 6/2005 | Tsuboi | 348/333.12 |
| 2006/0092292 A1 | * | 5/2006 | Matsuoka et al. | 348/231.99 |
| 2006/0136496 A1 | * | 6/2006 | Ohashi | 707/104.1 |
| 2010/0328492 A1 | * | 12/2010 | Fedorovskaya et al. | 348/231.2 |

FOREIGN PATENT DOCUMENTS

| | | |
|---|---|---|
| JP | A-2001-16573 | 1/2001 |
| JP | A-2001-51338 | 2/2001 |
| JP | A-2001-67004 | 3/2001 |
| JP | A-2004-46591 | 2/2004 |

* cited by examiner

Primary Examiner — Chieh M Fan
Assistant Examiner — Antoinette Spinks
(74) Attorney, Agent, or Firm — Oliff & Berridge, PLC

(57) ABSTRACT

A display apparatus includes an input section inputting an image of subject obtained by imaging a person who is a subject, a display section displaying the image of subject being input, a viewer imaging section imaging a viewer viewing the image of subject and generating an image of viewer, a viewer face-detection section detecting a face of the viewer by using the image of viewer, a viewer face-recognition section performing facial recognition based on individual parts of the face of the viewer being detected, an image processing section performing image correction on the image of subject based on a result of the facial recognition performed on the viewer, and a control section switching a display from the image of subject to the image of subject on which the image correction is performed.

9 Claims, 5 Drawing Sheets

Photo Frame

DISPLAY APPARATUS AND IMAGING APPARATUS

CROSS-REFERENCE TO RELATED APPLICATION

This application is based upon and claims the benefit of priority from Japanese Patent Application No. 2009-013134, filed on Jan. 23, 2009, the entire contents of which are incorporated herein by reference.

BACKGROUND

1. Field

The present application relates to a display apparatus and an imaging apparatus that can perform image correction processing.

2. Description of the Related Art

Conventionally, images taken by a digital camera or the like are stored in a storage device such as a hard disk, and only necessary images are printed with a printer or the like and are viewed. However, in recent years, electronic photo frames for viewing have been developed that can directly display image data without the need to print images taken (for example, see Japanese Unexamined Patent Application Publication No. 2001-67004).

Japanese Unexamined Patent Application Publication No. 2001-67004 discloses a technology with which images for viewing can be displayed on a display section and character information such as the time and a calendar can also be arranged and displayed according to the composition of the images for viewing so that, even when the display section is turned, it does not obstruct the display of the images for viewing.

However, in the conventional technology, for example, when a user desires to perform image correction to display a fine image of the user for viewing to the others, it is necessary for the user to use special image processing software or the like installed in a computer to correct the image for viewing and display it on an electronic photo frame such as one disclosed in Japanese Unexamined Patent Application Publication No. 2001-67004.

SUMMARY

In view of the problem in the conventional technology, a proposition of the present embodiment is to provide a technology capable of performing image correction processing according to a viewer who views an image.

To overcome the foregoing problem, according to one aspect of the present embodiment, a display apparatus includes an input section that inputs an image of subject obtained by imaging a person who is a subject, a display section that displays the image of subject being input, a viewer imaging section that images a viewer viewing the image of subject and generates an image of viewer, a viewer face-detection section that detects a face of the viewer by using the image of viewer, a viewer face-recognition section that performs facial recognition based on individual parts of the face of the viewer being detected, an image processing section that performs image correction on the image of subject based on a result of the facial recognition performed on the viewer, and a control section that switches a display from the image of subject to the image of subject on which the image correction is performed.

The display apparatus may further include a subject face-detection section that detects a face of the person in the image of subject, a subject face-recognition section that performs facial recognition based on individual parts of the face of the person being detected, and a person identifying section that identifies whether or not the person being face-recognized and the viewer are identical, and the image processing section may perform the image correction on the image of subject when the person identifying section identifies that the person and the viewer are identical.

The display apparatus may further include an operation member that is capable of setting whether or not the image processing section performs the image correction.

The display apparatus may further include a storage section that stores face information of a plurality of viewers, and a viewer determination section that determines whether or not the viewer face-recognized by the viewer face-recognition section matches one of the face information of the plurality of viewers stored in the storage section, wherein the image processing section does not perform the image correction on the image of subject when the viewer determination section determines as "matched", and the image processing section may perform the image correction on the image of subject when the viewer determination section determines as "not-matched".

The image processing section may perform the image correction on only an image region of the image of subject in which the person detected by the subject face-detection section is imaged when the person identifying section determines that the person and the viewer are identical.

The display apparatus may further include a sexual determination section that determines whether or not the person face-recognized by the subject face-recognition section and the viewer face-recognized by the viewer face-recognition section are of opposite sex, and the image processing section may perform the image correction on the image of subject when the sexual determination section determines as "opposite sex".

The display apparatus may further include a storage section that previously stores face information of a plurality of predetermined persons to be the subject, and a subject determination section that determines whether or not the person face-recognized by the subject face-recognition section matches one of the face information of the plurality of predetermined persons stored in the storage section, and the image processing section may perform the image correction on the image of subject when the subject determination section determines as "matched".

According to another aspect of the present embodiment, an imaging apparatus includes an imaging section that images a person who is a subject and generates an image of subject, and the display apparatus of the present embodiment.

With the present embodiment, it is possible to perform image correction processing according to a viewer who views an image.

DETAILED DESCRIPTION OF THE EMBODIMENT

An Embodiment

Figure 1:
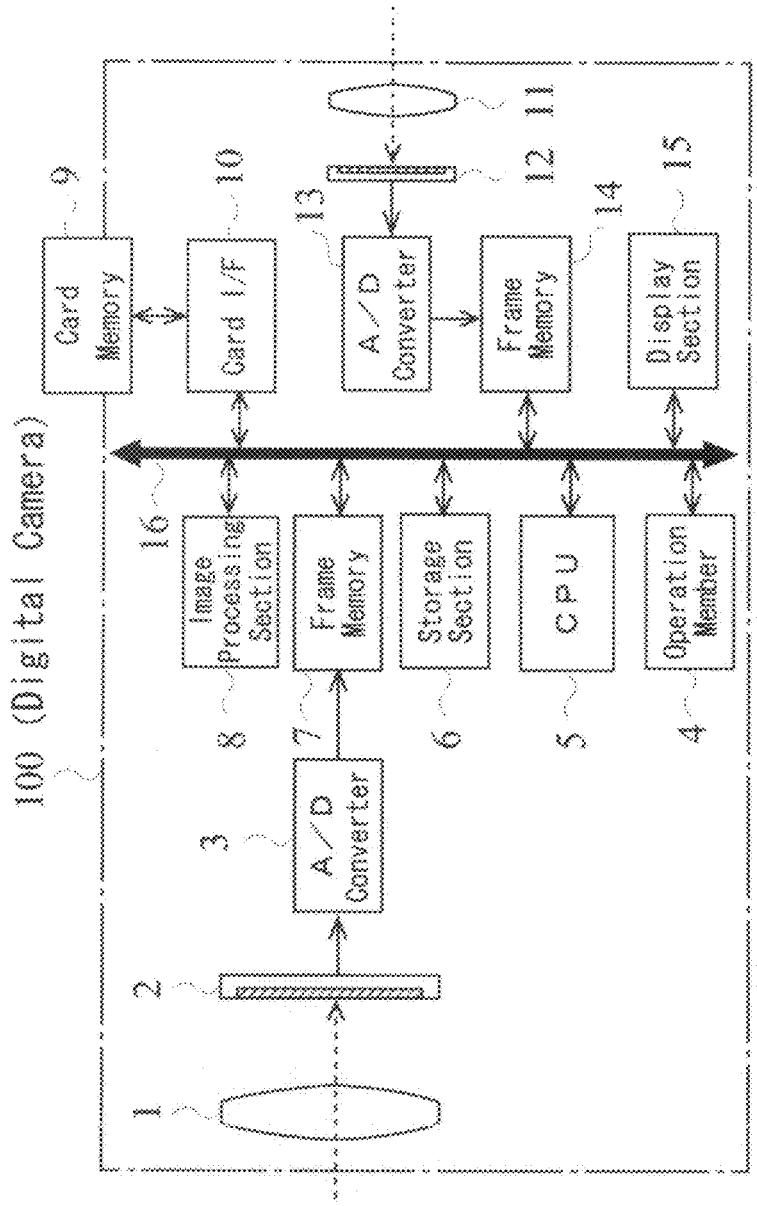
FIG. 1 is a diagram showing an example of the configuration of a digital camera 100 according to an embodiment of the present invention.
Figure 2:
FIG. 2 is a diagram showing an example of a viewer data table 20 stored in a storage section 6 of the digital camera 100 according to the embodiment of the present invention.

FIG. 1 is a diagram showing the configuration of a digital camera 100 according to an embodiment of present invention.

The digital camera 100 includes an imaging lens group 1, an imaging sensor 2, an A/D converter 3, an operation member 4, a CPU 5, a storage section 6, a frame memory 7, an image processing section 8, a card memory 9, a card interface (card I/F) 10, a viewer imaging lens group 11, a viewer imaging sensor 12, an A/D converter 13, a frame memory 14 and a display section 15. The operation member 4, the CPU 5, the storage section 6, the frame memory 7, the image processing section 8, the card I/F 10, the frame memory 14 and the display section 15 are coupled through a bus 16 so that they can exchange information with each other. FIG. 1 shows only main portions of the digital camera 100. For example, in FIG. 1, a timing generator and the like are omitted that issue, according to an instruction from the CPU 5, timing pulses for an imaging instruction to either the imaging sensor 2 and the A/D converter 3 or the viewer imaging sensor 12 and the A/D converter 13.

The imaging lens group 1 is made up of a plurality of optical lenses, and forms an image of subject on the light receiving surface of the imaging sensor 2. Likewise, the viewer imaging lens group 11 is made up of a plurality of optical lenses, and forms the image of subject, which is the viewer, on the light receiving surface of the imaging sensor 12.

The imaging sensor 2 and the imaging sensor 12 receive an instruction from the CPU 5, operate based on the timing pulses issued from the timing generator (not shown), obtain the image of subject formed by the imaging lens group 1 provided in front, convert the image into an image signal and output it. The imaging sensor 2 of this embodiment can take, based on an instruction from the CPU 5, the image of subject with all pixels, and take the image of subject for through images and moving images for use in live viewing by thinning out the pixels in the horizontal scan direction or in the vertical scan direction and then reading pixel values. On the other hand, the imaging sensor 12 takes, based on an instruction from the CPU 5, through images of the viewer by thinning out the pixels in the horizontal scan direction or in the vertical scan direction and then reading pixel values. As the imaging sensor 2 and the imaging sensor 12, CCD or CMOS semiconductor image sensors or the like can be used as appropriate.

The image signal output from the imaging sensor 2 is converted by the A/D converter 3 into a digital signal. The converted digital image signal is temporarily stored in the frame memory 7, and is then transferred to the storage section 6 or the image processing section 8. The A/D converter 3 preferably includes an analog front end having an amplifier that amplifies the analog signal from the imaging sensor 2 according to an ISO sensitivity.

On the other hand, the image signal output from the viewer imaging sensor 12 is converted by the A/D converter 13 into a digital signal. The converted digital image signal is temporarily stored in the frame memory 14. The image signal is read from the frame memory 14 according to a request from the CPU 5.

The operation member 4 outputs, to the CPU 5, an operation signal corresponding to the operation of the member by the user. The operation member 4 includes, for example, a power supply button, a button for setting a mode such as a shooting mode and a shutter release button. The operation member 4 may include touch panel buttons displayed on the screen of the display section 15.

When the power of the digital camera 100 is turned on through the operation of the power supply button in the operation member 4 by the user, the CPU 5 reads a control program stored in the storage section 6 and initializes the digital camera 100. When the CPU 5 receives an instruction from the user through the operation member 4, the CPU 5 provides, to the imaging sensor 2, either an instruction to take a still image of subject with all the pixels or an instruction to take through images and moving images by the thinning-out reading based on the control program through the timing generator (not shown). The CPU 5 displays the taken still image on the display section 15; in this embodiment, as described later, when a processing mode for correcting the taken still image is set through the mode setting button of the operation member 4, the CPU 5 uses the viewer imaging sensor 12 to obtain an image of the viewer who views the still image, performs face-detection and face-recognition of the viewer, performs correction processing on the still image according to the viewer and displays it on the display section 15. The CPU 5 also controls the image processing section 8 so as to perform image processing on the taken still image, moving image and the like and to store the processed images in the card memory 9 and the storage section 6. As the CPU 5, a CPU used in a common computer can be used.

The storage section 6 stores the still image, moving image and the like that are taken by the digital camera 100 and the control program that the CPU 5 uses to control the digital camera 100. The storage section 6 further stores a viewer data table 20 that lists the names of face information files including face images of the viewer and information on face parts such as mouth corners and tails of the eyes. The settings of the viewer data table 20 of this embodiment can be updated by the operation of the operation member 4 by the user. As persons who are registered as the viewer in the viewer data table 20, family members, friends, customers and the like can be considered, but other persons may be registered. In the following description, the information of face information files of a plurality of persons such as family members and friends is assumed to be registered as a list in the viewer data table 20 and stored in the storage section 6. These programs and data stored in the storage section 6 can be referenced as appropriate from the CPU 5 through the bus 16. As the storage section 6, any nonvolatile memory or the like, which is a common hard disk device, optical magnetic disc device or semiconductor memory, can be selected and used as appropriate.

As the frame memory 7 and the frame memory 14, among semiconductor memories, any nonvolatile semiconductor can be selected and used as appropriate.

The image processing section 8 is a digital front end circuit, and performs image processing such as pixel interpolation processing, color conversion processing and white balance correction on image data of still images, moving images, through images or the like from the frame memory 7, the frame memory 14 and the storage section 6. As described above, in this embodiment, based on an instruction from the CPU 5, an image correction such as an exposure correction, a soft focus correction, a beautiful skin correction, a slimming correction or a wrinkle correction is performed, according to the viewer, on the sensed still images that are displayed on the display section 15.

The card memory 9 is removably fitted to the card I/F 10. The images stored in the frame memory 7 and the storage section 6 undergo, based on an instruction from the CPU 5, image processing in the image processing section 8, and are then stored in the card memory 9 as the file of a format such as an Exif format or a YUV format.

The display section 15 displays moving images or still images such as through images taken by the imaging sensor 2, still images corrected according to the viewer, mode setting screens or the like. As the display section 15, a liquid crystal monitor or the like can be selected and used as appropriate.

Figure 3:
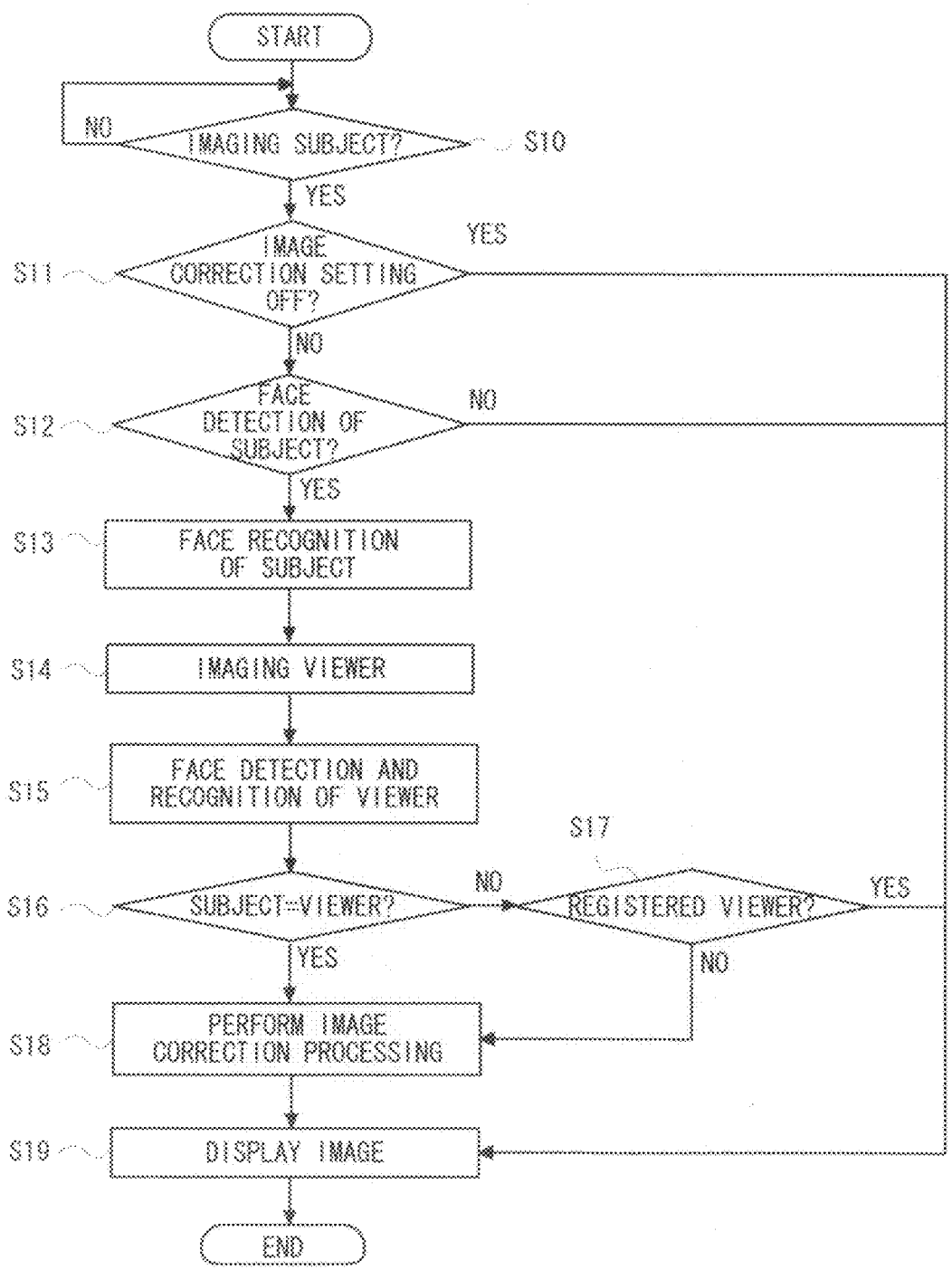
FIG. 3 is a flowchart showing a processing procedure in an image correction mode of the digital camera 100 according to the embodiment of the present invention.

Processing for correcting still images displayed on the display section 15 according to the viewer in the digital camera 100 of this embodiment will now be described with reference to a flowchart shown in FIG. 3. This type of processing is assumed to be performed such as in a case where a taken still image is shown to a photographer (user) himself or herself, a person who is the photographer and the subject, or a third party through the display section 15 of the digital camera 100.

First, when the user presses the power supply button in the operation member 4, the CPU 5 reads the control program stored in the storage section 6 of the digital camera 100, and initializes the digital camera 100. At the same time, the CPU 5 reads the viewer data table 20 stored in the storage section 6, and stores it in a memory (unillustrated) within the CPU 5.

Then, the user sets, with the mode setting button of the operation member 4, the image correction mode and the like used when the taken still image is displayed on the display section 15. The image correction mode of the digital camera 100 of this embodiment includes a mode for correcting an image whoever the viewer is, a mode for not correcting an image whoever the viewer is and a mode for correcting an image according to the relationship between the person who is the subject and the viewer. The user selects any one of them and sets it. In this embodiment, the user sets the mode for correcting an image according to the relationship between the person who is the subject and the viewer. The user can also set the content of the processing for correcting the taken still image. In the following description, as the default, the image correction processing is set that includes the soft focus correction, the beautiful skin correction and the wrinkle correction previously set in the digital camera 100.

After the completion of the setting of the correction processing mode and the like described above, the digital camera 100 performs processing starting from next step S10.

In step S10, until the CPU 5 receives an instruction to image the subject from the user, the CPU 5 displays, at a predetermined frame rate (for example, 30 fps), the through images of the image of subject on the display section 15 that are read from the imaging sensor 2 by the thinning-out reading, and is put on standby (on the "NO" side). If the shutter release button of the operation member 4 is pressed by the user, the CPU 5 determines that the instruction to image the subject is provided, and makes the imaging sensor 2 take the still image with all the pixels through the timing generator (not shown). The CPU 5 transfers the still image to the image processing section 8 through the frame memory 7 and the bus 16, and performs the image processing such as the pixel interpolation processing, the color conversion processing and the white balance correction. Then, the CPU 5 converts the still image thus image-processed into a file format such as the Exif format, and stores it in the storage section 6 or the card memory 9, and then the process proceeds to step S11 (on the "YES" side). In this embodiment, the CPU 5 displays, on the display section 15, as a preview image for checking, the still image that has been taken and subjected to the image processing by the image processing section 8 temporarily for a predetermined period of time (for example, five seconds). Then, until the following image correction processing corresponding to the viewer recognized by the viewer imaging sensor 12 is performed and then the display is produced again, the CPU 5 does not display anything on the display section 15.

In step S11, the CPU 5 determines whether or not the image processing mode set by the user is the mode for not correcting an image whoever the viewer is. If the CPU 5 determines that the mode for not correcting an image is set, the process proceeds to step S19 (on the "YES" side) where a still image taken without any correction processing being performed is displayed on the display section 15, and then a series of the processing is completed. On the other hand, if the CPU 5 determines that the mode for not correcting an image is not set, the process proceeds to step S12 (on the "NO" side).

In step S12, the CPU 5 determines, based on the face-detection, whether or not the person who is the subject is taken in the obtained still image. Here, as a face-detection method performed by the CPU 5, any known method can be selected and performed as appropriate. Specifically, the CPU 5 extracts feature points in the amount of image characteristic such as an edge amount from the still image to detect the region, the size and the like of the face of each imaged person. If the CPU 5 determines that no one is imaged, the process proceeds to step S19 (on the "NO" side) where the still image taken without any correction processing being performed is displayed on the display section 15, and then a series of the processing is completed. On the other hand, if the CPU 5 determines that a person is imaged, the process proceeds to step S13 (on the "YES" side)

In step 13, the CPU 5 performs the face-detection to check who the person detected in step S12 is. As the face-detection method performed by the CPU 5, any known method can be selected and performed as appropriate. Specifically, the CPU 5 determines the position of feature points of the face, the size of face parts such as mouth corners and tails of the eyes and the like based on the feature points of the face of the detected person.

In step S14, the CPU 5 obtains, at a predetermined frame rate (for example, 30 fps), the through images of the viewer by performing the thinning-out reading of the viewer in the viewer imaging sensor 12.

In step S15, the CPU 5 detects and recognizes the face of the viewer in the through images obtained in step S14. Here, as in steps S12 and S13, as the face-detection and the face-recognition methods performed by the CPU 5, any known methods are selected and performed as appropriate. The CPU 5 obtains the face image of the detected viewer and information on the face parts of the recognized face.

In step S16, the CPU 5 uses the face image of the person in the still image detected in step S12, the face parts recognized in step S13 and the face image of the viewer detected in step S15 and the face parts face-recognized to determine whether or not the person in the still image is identical to the viewer. Specifically, the CPU 5 compares the face image of the person in the still image detected in step S12, the face parts recognized in step S13 and the face image of the viewer detected in step S15 and the face parts face-recognized in step S15 to determine a similarity degree while adjusting the relative positions and the size of the feature points and the like. If the similarity degree is equal to or more than a predetermined value (for example, 80%), the CPU 5 determines that the person in the still image is identical to the viewer, and the process proceeds to step S18 (on the "YES" side). On the other hand, if the similarity degree is less than the predetermined value, the CPU 5 determines that the person in the still image is not identical to the viewer, and the process proceeds to step S17 (on the "NO" side).

In step S17, the CPU 5 determines, based on the face image of the viewer detected in step S15 and the face parts face-recognized in step S15, whether or not the viewer is the person registered in the viewer data table 20 stored in the storage section 6. Specifically, as in step S16, the CPU 5 compares the face image of the viewer detected in step S15 and the face parts recognized in step S15 with the face image and the face information of each person registered in the viewer data table 20 to determine a similarity degree while adjusting the relative positions and the size of the feature points and the like. If the similarity degree is equal to or more than a predetermined value (for example, 80%), the CPU 5 determines that the viewer is the person registered in the viewer data table 20, and the process proceeds to step S19 (on the "YES" side). Then, for example, if the registered person is one of the family members, the friends and the like, the CPU 5 displays the still image taken without any correction processing being performed on the display section 15, and then a series of the processing is completed. On the other hand, if the similarity degree is less than the predetermined value, the CPU 5 determines that the viewer is not the registered person and the process proceeds to step S18 (on the "NO" side).

In step S18, the CPU 5 transfers the still image to the image processing section 8 based on the determination result in step S16 or S17, and the image processing section 8 performs the image correction preset in the digital camera 100 on the still image.

In step S19, the CPU 5 displays, on the display section 15, the still image corrected by the image processing section 8 in step S18 or the still image without any image correction being performed, and then a series of the processing is completed.

As described above, in this embodiment, the face-recognition is performed on the person in the still image and the viewer based on the registration of the viewer data table 20, and the correction processing is performed on the still image according to the relationship between the viewer and the person in the still image, resulting in that the still image can be optimally displayed to the viewer.

By performing the image correction processing, it is possible to give favorable impression to the person in the still image and the viewer.

Supplemental Description of the Embodiment

Although, in this embodiment, before the real imaging of subject, the user uses the mode setting button of the operation member 4 to set the image correction mode, the present invention is not limited to this. For example, when the user uses the mode setting button of the operation member 4 to set the shooting mode such as a landscape mode, a party mode or a night view mode, such a mode is prioritized higher than the image correction mode; the predetermined image correction mode may be forcibly set according to the shooting mode.

Although, in this embodiment, the image correction processing performed when the viewer is present is described, the present invention is not limited to this. For example, when the CPU 5 cannot detect a viewer in the through images obtained by the viewer imaging sensor 12, the still image without the image correction being performed may be displayed on the display section 15 or the corrected still image of the previous viewer may be continuously displayed.

In this embodiment, the taken still image is subjected to the image processing by the image processing section 8, and then the CPU 5 displays it on the display section 15 as the preview image for checking for the predetermined period of time, and thereafter, until the image correction corresponding to the viewer recognized by the viewer imaging sensor 12 is performed and then the display is produced again, the CPU 5 does not display anything. However, the present invention is not limited to this, and the still image before the correction may be displayed on the display section 15 until the corrected still image is displayed.

Although, in this embodiment, in step S19, the still image corrected by the image processing section 8 or the still image that has not undergone any image correction is displayed on the display section 15, the present invention is not limited to this. For example, not only the still image but also what type of correction processing is performed on the still image may be displayed on the display section 15.

Although, in this embodiment, if, in step S17, the viewer is not the person who is registered in the viewer data table 20, the image processing section 8 performs, on the still image, the image correction processing set as the default preset in the digital camera 100, the present invention is not limited to this. For example, the user may freely set the content of the image correction processing through the operation member 4.

Moreover, in step S15, based on the face-recognition (for example, the number of wrinkles, facial expressions and an age estimation) of the viewer, the CPU 5 may check whether the viewer is a small child such as a grade school student, an elderly person, a male or female, determine the content of the image correction (including the case where the image correction is not performed) and make the image processing section 8 perform the image correction according to the content. If the person in the still image and the viewer are of opposite sex, the CPU 5 preferably makes the image processing section 8 correct the still image to make it appear beautiful.

Figure 5:
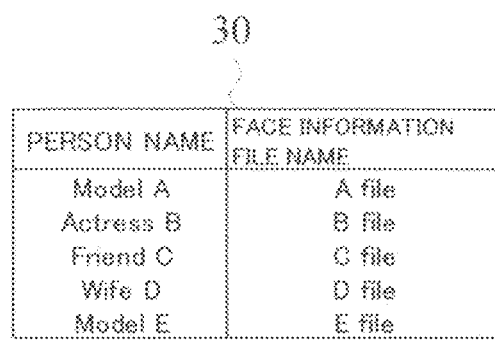
FIG. 5 is a diagram showing an example of a subject data table 30 stored in the storage section 6 of the digital camera 100 according to the embodiment of the present invention.

If the person in the still image is a model, an actress or the like, it is generally thought that the person desires to make the still image appear beautiful to all the viewers. Hence, preferably, for example, as shown in FIG. 5, a subject data table 30 that lists the face information files of a plurality of models, actresses and the like registered as predetermined persons is stored in the storage section 6, and, when an image of the model, the actress or the like registered in the subject data table 30 is taken, whoever the viewer is, the preset image correction is performed on the image without fail and the image is beautifully displayed on the display section 15.

Although, in this embodiment, the CPU 5 makes the image processing section 8 perform the correction processing on the entire still image, the present invention is not limited to this. For example, when the images of a plurality of persons are taken in the still image and the viewer is one of those persons, the CPU 5 may make the image processing section 8 perform the image correction on only the region of the viewer in the still image who has been face-detected in step S12. Although, in this embodiment, the correction display performed at the time of shooting is described, it can also be applied to the case where the already stored image is reproduced. In this case, for example, in step S10 shown in FIG. 3, the CPU 5 determines whether or not the reproduction is started. The CPU 5 is placed on standby for the start of the reproduction, and, if the CPU 5 determines that an instruction to start the reproduction is provided, it performs the processing in step S11 and the subsequent steps.

Figure 4A:
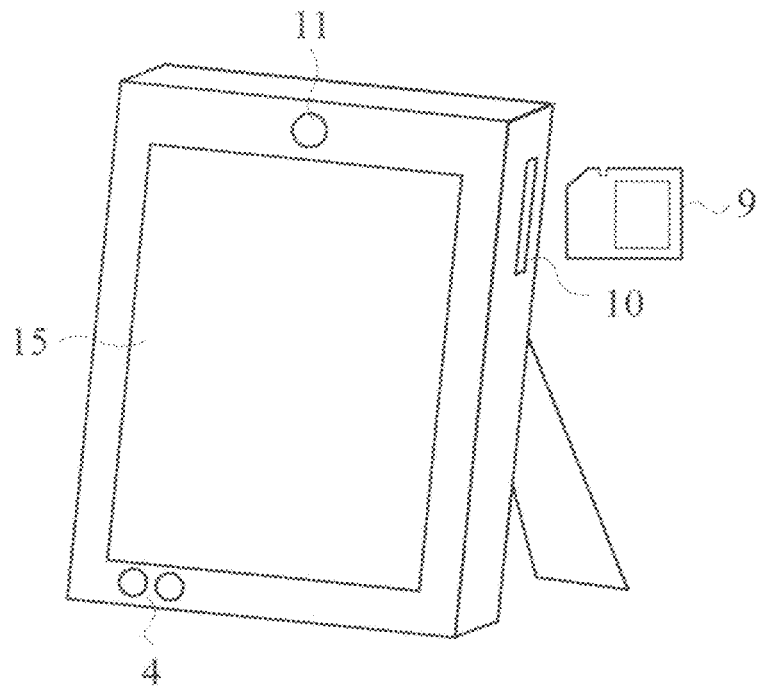
FIG. 4A is a schematic diagram showing an example of the shape of a photo frame according to the present invention.
Figure 4B:
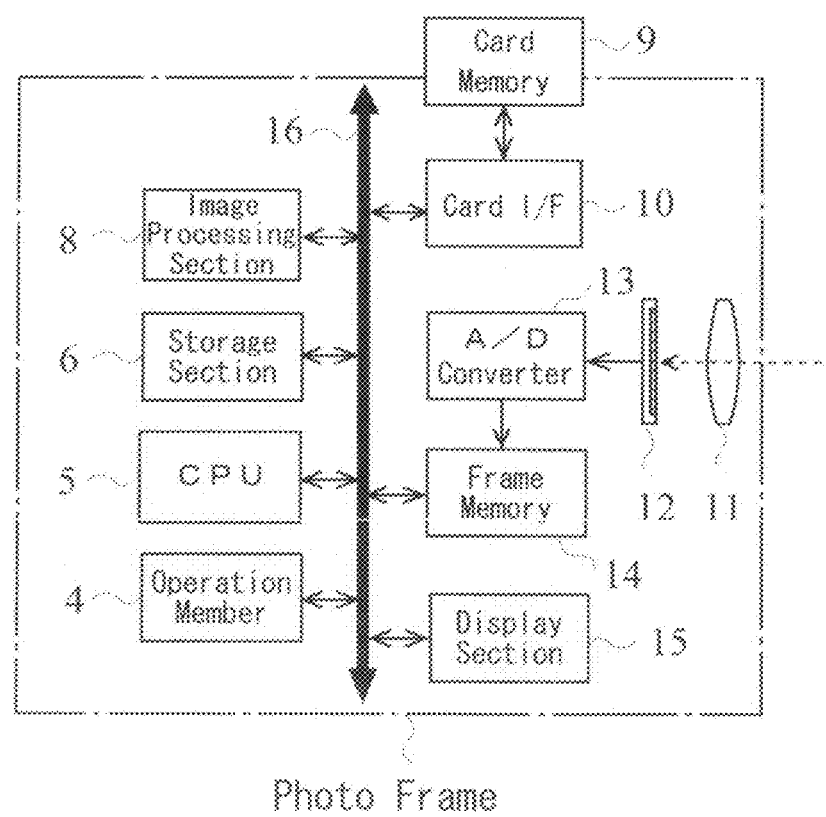
FIG. 4B is a schematic diagram showing an example of the configuration of the photo frame according to the present invention.

Although the digital camera 100 is described in this embodiment, the present invention is not limited to this. The present invention can be applied to a photo frame shown in FIG. 4A having a configuration as shown in FIG. 4B. In this case, the photo frame can be performed as in the reproduction of the digital camera 100.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. A display apparatus, comprising:
    an input section inputting an image of subject obtained by imaging a person who is a subject;
    a display section displaying the image of subject being input;
    a viewer imaging section imaging a viewer viewing the image of subject and generating an image of viewer;
    a viewer face-detection section detecting a face of the viewer by using the image of viewer;
    a viewer identifying section identifying the viewer by performing facial recognition based on individual parts of the face of the viewer being detected;
    an image processing section performing image correction on the image of subject based on a result of identification of the viewer;
    a control section switching a display from the image of subject to the image of subject on which the image correction is performed;
    a subject face-detection section detecting a face of the person in the image of subject;
    a subject face-recognition section performing facial recognition based on individual parts of the face of the person being detected; and
    a person identifying section identifying whether or not the person being face-recognized and the viewer are identical, wherein
    the image processing section performs the image correction on the image of subject when the person identifying section identifies that the person and the viewer are identical.

2. The display apparatus according to claim 1, further comprising
    an operation member capable of setting whether or not the image processing section performs the image correction.

3. The display apparatus according to claim 1, further comprising:
    a storage section storing face information of a plurality of viewers; and
    a viewer determination section determining whether or not the viewer identified by the viewer identifying section matches one of the face information of the plurality of viewers stored in the storage section, wherein
    the image processing section does not perform the image correction on the image of subject when the viewer determination section determines as "matched", and the image processing section performs the image correction on the image of subject when the viewer determination section determines as "not-matched".

4. The display apparatus according to claim 1, wherein
    the image processing section performs the image correction on only an image region of the image of subject in which the person detected by the subject face-detection section is imaged when the person identifying section determines that the person and the viewer are identical.

5. The display apparatus according to claim 1, further comprising:
    a sexual determination section determining whether or not the person face-recognized by the subject face-recognition section and the viewer identified by the viewer identifying section are of opposite sex, wherein
    the image processing section performs the image correction on the image of subject when the sexual determination section determines as "opposite sex".

6. The display apparatus according to claim 1, further comprising:
    a storage section previously storing face information of a plurality of predetermined persons to be the subject; and
    a subject determination section determining whether or not the person face-recognized by the subject face-recognition section matches one of the face information of the plurality of predetermined persons stored in the storage section, wherein
    the image processing section performs the image correction on the image of subject when the subject determination section determines as "matched".

7. An imaging apparatus, comprising:
    an imaging section imaging a person who is a subject and generating an image of subject; and
    the display apparatus according to claim 1.

8. The display apparatus according to claim 1, wherein the image of subject and the image of viewer are imaged at different timings.

9. The display apparatus according to claim 1, wherein the viewer imaging section generates the image of viewer by imaging the viewer when viewing the image of subject.

* * * * *